(No Model.) 2 Sheets—Sheet 1.
A. PORTER.
LAWN MOWER.
No. 441,970. Patented Dec. 2, 1890.
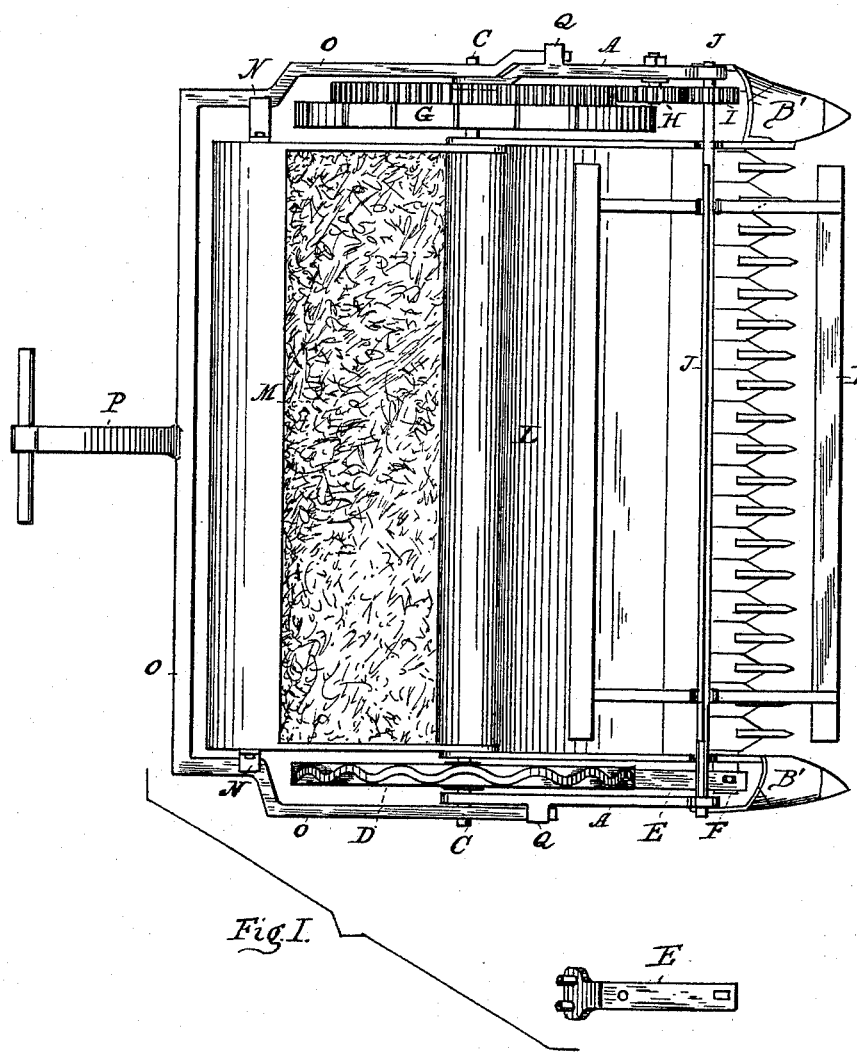
Fig. I.
WITNESSES:
R. S. Millar
Anna A. Farrell
INVENTOR:
Arthur Porter.
By J. Bailey
Attorney.

(No Model.) 2 Sheets—Sheet 2.
A. PORTER.
LAWN MOWER.
No. 441,970. Patented Dec. 2, 1890.
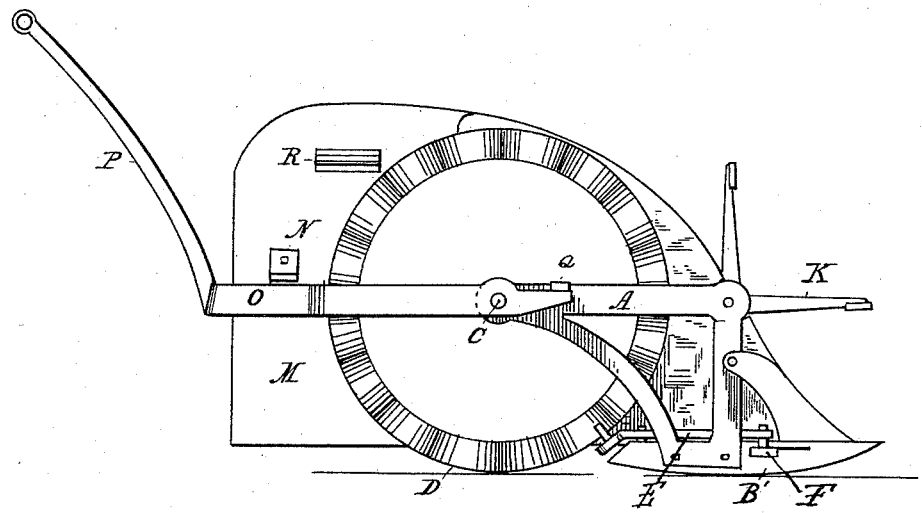
Fig. II.
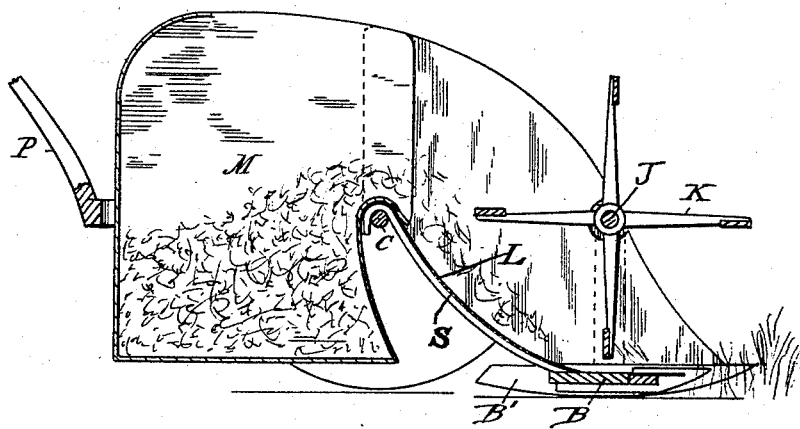
Fig. III.
WITNESSES:
R. S. Millar
Anna A. Farrell
INVENTOR:
Arthur Porter
By O. J. Bailey
Attorney.

UNITED STATES PATENT OFFICE.

ARTHUR PORTER, OF GALENA, ILLINOIS.

LAWN-MOWER.

SPECIFICATION forming part of Letters Patent No. 441,970, dated December 2, 1890.

Application filed April 5, 1889. Serial No. 306,091. (No model.)

*To all whom it may concern:*

Be it known that I, ARTHUR PORTER, of Galena, in the county of Jo Daviess and State of Illinois, have invented a new and useful Improvement in Lawn-Mowers, which improvement is fully set forth in the following specification and accompanying drawings, in which—

Figure I is a top view of my improved lawn-mower and a detail view of the oscillating lever; Fig. II, a side view showing the cam-wheel and its connection with the cutting apparatus, and Fig. III a longitudinal sectional view.

My invention relates particularly to improvements in machines employed for mowing lawns; and its object is to provide a simple, inexpensive, and efficient device easily handled and readily adjustable while in operation, so that grass may be cut high or low at the will of the operator. It is capable of mowing grass at all stages of growth, and is provided with a revolving rake and a receptacle for the cut grass. The receptacle may be readily removed, emptied, and replaced. The cutter-bar being entirely in front of the machine, it is thus enabled to work close to trees, plants, or other obstructions.

Referring to the accompanying drawings, A designates an integral triangular frame at each side of the machine. The lower angles of these frames are attached to the finger-bar B. The main axle C is pivoted in these frames. A driving-wheel D, having a serpentine or waved cam on its periphery, is attached to one end of the axle and engages friction-rollers on the bifurcated ends of a pivoted and oscillating lever E, which transmits reciprocating motion to the cutter-bar F. A driving-wheel G is attached to the other end of the axle, and is provided near its periphery with cogs which engage a pinion-wheel H, pivoted to the upper limb of the triangular frame A. An additional pinion-wheel I completes the gearing and transmits motion to the shaft J of the revolving rake K. An apron L, made of light sheet metal, is attached to the upper surface of the finger-bar, and is bent upwardly and rearwardly over two pendent hooks or brackets S—one on each side—and thence downwardly close to and in the rear of the main axle. The said brackets are attached to the under side of the apron, and their hooked ends rest upon the axle. A support is thus provided for the rear edge of the apron, and at the same time the finger-bar being attached thereto is made vertically adjustable upon the main axle.

The receptacle M is, like the apron, preferably made of light sheet metal. The front sides are hook-shaped and rest upon the apron. The body of the receptacle extends downwardly in the rear of the apron and is normally supported by lugs N, which engage the bail O, to which the handle P is attached. The side limbs of the bail are pivotally attached to the outer ends of the main axle, and their forward extensions are adapted to pass under and, in the downward movement of the handle, engage lugs Q, which are attached to the upper limbs of the triangular frames A. It will be understood that by this arrangement the vertical adjustment of the finger-bar and the cutting apparatus is entirely under control of the operator while the machine is in motion. When the handle P is in its normal position, it will be seen that the bail is in contact with the lugs N, and the finger-bar moves near the surface of the ground and performs its work accordingly. If the handle be slightly elevated, the finger-bar, being entirely freed from the bail, will move in contact with the ground. If the handle be depressed, the forward ends of the bail engage the lugs Q in front of the main axle, and thereby raise the finger-bar, so that it may pass over obstructions; or, if desired, it may be held in that position and thereby increase the height of the cut.

The cutting apparatus and the revolving rake, being both attached to the triangular frame, preserve their relative positions under all the varying adjustments effected by the handle. The cut grass is caught by the wings or sweeps of the revolving rake and is thrown backwardly over the apron and into the receptacle.

Brackets R upon the sides of the receptacle enable the operator to remove and replace it without inconvenience. The ends of the finger-bar are suitably guarded by suitable shoes B', and the pinions of the revolving rake may also be guarded from the cut grass by light metal shields.

What I claim as new is—

1. The combination of the axle, the apron secured at its lower edge upon the finger-bar, and the brackets having hooked ends hooking over said axle, their lower ends being secured to the under side of the apron, substantially as set forth.

2. The combination of the frames carrying an apron and the receptacle adapted to receive the cut grass from the cutter-bar, and the bail having its side limbs pivoted upon the main axle and reaching forward and engaging lugs on said frame, said receptacle having lugs also engaging said side limbs of the bail, and said bail having a handle, substantially as set forth.

3. The combination of the axle C, the bracket S, having hooked ends hooking over said axle, the apron L, the finger-bar B, the cutter-bar F, operated by means of the lever E, the cam-edged driving-wheel, and the receptacle, substantially as and for the purpose set forth.

4. The combination of the axle C, the brackets S, having hooked ends attached to the axle, the apron L, the finger-bar B, the cutter-bar F, operated by means of the lever E, the driving-wheel having a cam on its periphery, the receptacle at the rear of the axle, and the revolving rake in front of it, substantially as described.

In testimony that I claim the foregoing I have hereunto set my hand, this 26th day of March, 1889, in the presence of witnesses.

ARTHUR PORTER.

Witnesses:
LOUIS A. ROWLEY,
CECILE CORWITH.